(12) United States Patent
Hannaford et al.

(10) Patent No.: US 8,235,176 B2
(45) Date of Patent: Aug. 7, 2012

(54) LUBRICATION AND SCAVENGE SYSTEM

(75) Inventors: Mark Hannaford, Clevedon (GB); John L. Gibbons, Gloucester (GB); John Astley, Bristol (GB); Hamish Constable, Bristol (GB)

(73) Assignee: Rolls-Royce PLC, London (GB)

( * ) Notice: Subject to any disclaimer, the term of this patent is extended or adjusted under 35 U.S.C. 154(b) by 652 days.

(21) Appl. No.: 12/379,227

(22) Filed: Feb. 17, 2009

(65) Prior Publication Data

US 2009/0250296 A1 Oct. 8, 2009

(30) Foreign Application Priority Data

Apr. 4, 2008 (GB) .................................. 0806053.5

(51) Int. Cl.
*F01M 11/03* (2006.01)
(52) U.S. Cl. ........................................................ 184/6.2
(58) Field of Classification Search ............... 184/6.2, 184/6.11
See application file for complete search history.

(56) References Cited

U.S. PATENT DOCUMENTS

| | | | | |
|---|---|---|---|---|
| 2,604,188 | A * | 7/1952 | Marchant | 184/6.11 |
| 4,137,997 | A * | 2/1979 | Ando | 184/6.22 |
| 4,281,942 | A * | 8/1981 | Gaeckle et al. | 403/38 |
| 4,344,506 | A * | 8/1982 | Smith | 184/6.11 |
| 4,732,236 | A * | 3/1988 | Jacques | 184/6.2 |
| 4,756,664 | A * | 7/1988 | Cohen et al. | 415/175 |
| 4,858,427 | A * | 8/1989 | Provenzano | 60/39.08 |
| 7,811,001 | B2 * | 10/2010 | Swainson | 384/462 |
| 2009/0250296 | A1 * | 10/2009 | Hannaford et al. | 184/6.2 |

FOREIGN PATENT DOCUMENTS

| | | |
|---|---|---|
| EP | 1 724 445 A2 | 11/2006 |
| GB | 677490 A | 8/1952 |
| GB | 774197 | 5/1957 |
| GB | 2 043 799 A | 10/1980 |
| GB | 2 440 544 A | 2/2008 |
| JP | A-61-181641 | 8/1986 |
| JP | 2004-332928 | 11/2004 |
| JP | A-2006-283791 | 10/2006 |

OTHER PUBLICATIONS

European Search Report dated Feb. 16, 2011 in corresponding European Patent Application No. 09 25 0384.6.

* cited by examiner

*Primary Examiner* — Michael Mansen
*Assistant Examiner* — Mark K Buse
(74) *Attorney, Agent, or Firm* — Oliff & Berridge, PLC

(57) ABSTRACT

A lubrication and scavenge system for a gas turbine, capable continued operation in nose-down or nose-up orientations, has a number of oil drainage passages to return oil to one or more collection chambers adjacent a rolling element bearing. A rotary impellor in the chamber forces the oil into a scavenge off-take passageway in the chamber wall leading to a scavenge pump. However, in some orientations windage effects in the chamber can return the oil to the drainage passage rather than permitting the impellor to centrifuge it into the off-take passageway. As a result oil starvation may occur. To avoid this and improve scavenging a shield is located between the drainage path and the off-take passageway adjacent to a face of the impellor. The shield may comprise an additional member, but preferably is formed integrally with a bearing race so as to ease assembly.

10 Claims, 3 Drawing Sheets

LUBRICATION AND SCAVENGE SYSTEM

BACKGROUND

The invention relates to a lubrication and scavenge system. In particular it concerns a lubrication and scavenge system for a rolling element bearing arrangement in a gas turbine engine.

An oil system provides lubrication, cooling and corrosion protection for numerous internal components. In general, gas turbine engines employ a self-contained recirculatory oil system that distributes oil from an oil tank under pressure to bearing chambers and other components throughout the engine. Once the oil has performed its immediate function it falls into a collection volume and is returned to the oil tank by scavenge pumps. Gravity plays some part in the collection process and engine designs must ensure avoid, irrespective of engine orientation, spaces which prevent oil being picked-up by the scavenge pumps. In extreme circumstances this can interrupt recirculation of the oil and lead to oil starvation. The present invention has for an objection to maintain an oil recirculation path in all circumstances.

The use of lubricant scavenge systems in gas turbine engines in which lubricating oil is collected and pumped back to an oil reservoir has been long established practice. GB Patent No 774,197 issued to power jets (Research and Development) Limited published in 1957 described a gas turbine lubrication system including an oil scavenge pump having a rotor

SUMMARY

According to one aspect of the invention there is provided a lubricant scavenge system comprising a scavenge pump, a collection chamber, at least one drainage path leading into the collection chamber, a rotary impellor located in the chamber, at least one off-take passageway in a chamber wall leading from the collection chamber to the scavenge pump, and a shield located between the drainage path and the off-take passageway adjacent a face of the impellor and acting in operation to shield the face of the impellor.

BRIEF DESCRIPTION OF THE DRAWINGS

The invention and how it may be carried into practice will now be described in more detail with reference to the accompanying drawings in which.

DETAILED DESCRIPTION OF EMBODIMENTS

Figure 1:
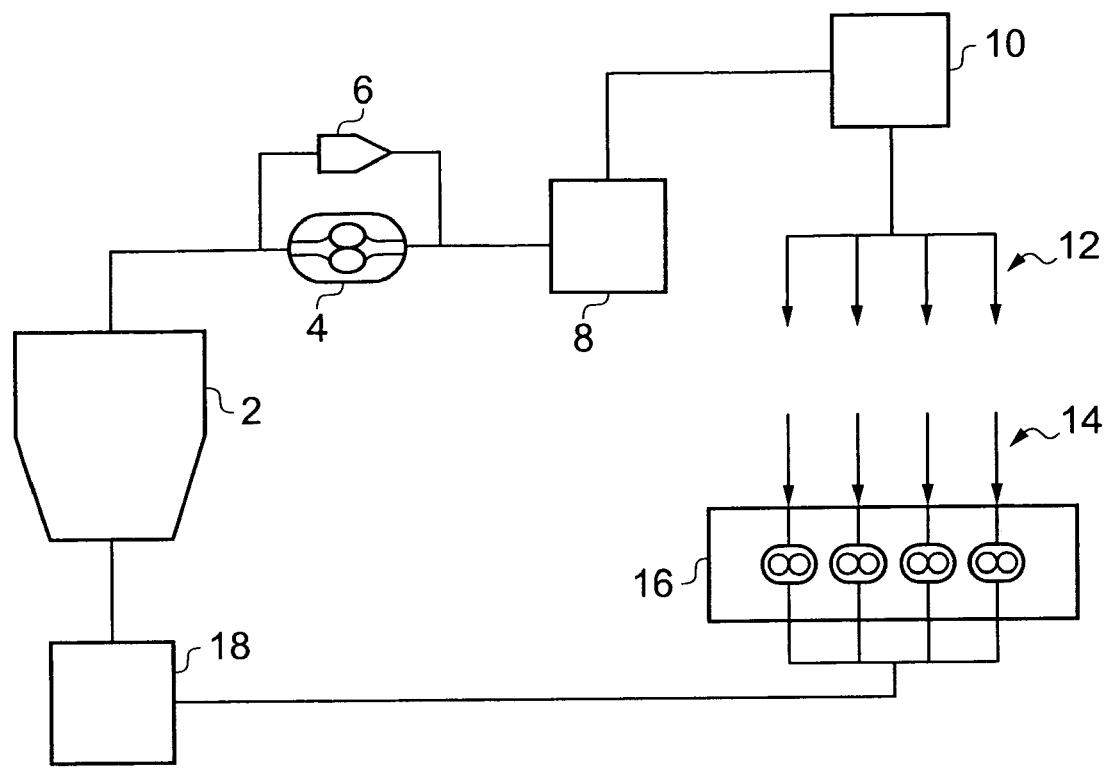
FIG. 1 shows a schematic diagram of an oil lubrication and scavenge system.

Referring now to FIG. 1, there is shown a simplified schematic of a typical oil lubrication and scavenge system for a gas turbine engine is illustrated. The system comprises an oil tank or reservoir 2 from which lubrication oil is drawn by a pump indicated at 4. The particular system on which the illustration is based is of the pressure relief type in which the pressure of the oil flow to bearing chambers (not shown) is controlled by a pressure relief valve 6. The pressurised oil passes through a filter 8 and then a heat exchanger 10 before being distributed to oil supply jets, generally indicated at 12, located in a plurality of bearing chambers, the engine gearbox, etc. The oil feed pump 4 is a positive displacement pump that delivers a known flow, proportional to pump speed. Oil pressure is generated by resistance to oil flow in the oil supply pipes backed by the bearing chamber pressures. The desired flow of oil to a component can be achieved by use of a suitably sized restriction known as an oil jet 12 at the end of the oil line. The design of the jet can provide either a ray or a targeted, coherent stream of oil, directed to a component or to a catching feature that will then feed the component.

Lubrication oil supplied to the bearings etc. is evacuated from bearing chambers and the like and returned to the oil tank 2 by a scavenge system. In the first step of this return cycle oil is drained from bearing chambers, or wherever it has been utilised, to one or more collection chambers where it is directed into a scavenge-offtake 14 where the oil is picked-up by a scavenge pump 16 and returned to the oil tank 2 through a scavenge filter 18. The return path includes a de-aerator to remove entrained air from the oil. Oil tank 2 provides a reservoir of oil to supply the oil system. The de-aerating device may be incorporated within the oil tank 2 or the return passageway for example adjacent the scavenge filter to remove air from the returning scavenged oil.

Scavenge pumps 16 generally follow the same construction as the oil feed pump 4. Each bearing chamber is serviced by a dedicated scavenge pump 16 except where bearing chamber pressure or gravity can be used to drive the oil to a shared sump. The capacity of a scavenge pump 16 is usually much greater than the oil flow it is required to return to the tank 2, in order to accommodate non-linear flow/speed relationships and aeration of the oil. Engines designed to operate for extended periods in zero or negative gravity flight conditions will have oil tanks that incorporate features ensuring a continuous supply of oil.

Figure 2:
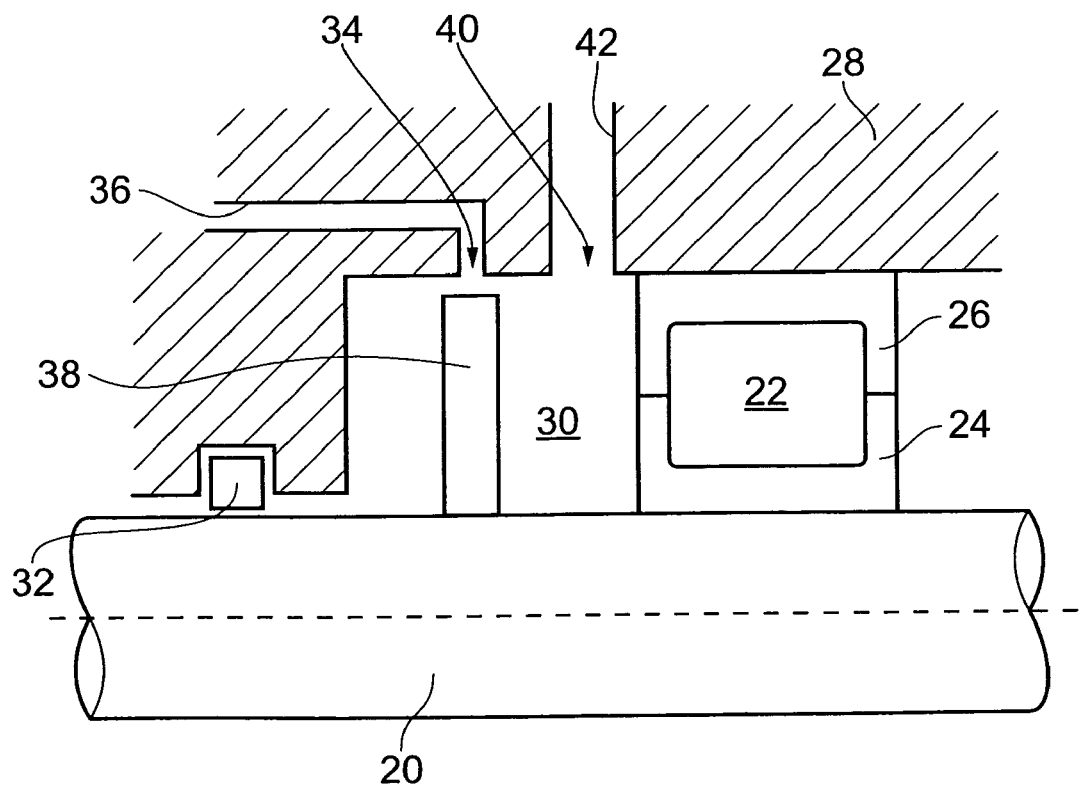
FIG. 2 is a schematic illustration of a rolling element bearing showing the oil scavenge arrangement.

FIG. 2 shows a schematic diagram of a bearing chamber and its associated scavenge off take arrangement. A supported shaft 20 is journaled in a rolling element bearing indicated generally at 22, the inner race 24 of the bearing is fixed to the shaft 20 and the outer race 26 of the bearing is fixed in a bearing housing. A small sump region or collection chamber 30 surrounding the shaft 20 is formed between the bearing 22, a shaft seal 32 and bounded by the bearing chamber wall 28 on its radially outer surface. Set into the chamber wall 28 is a scavenge off take port 34 and passageway 36 leading to a scavenge pump (not shown). Although only one scavenge port 34 is shown there may be a plurality of such orifices spaced apart around the chamber wall 28 leading into the scavenge passageway 36. Similarly, there may be more than a single passageway. Facing scavenge port 34 is a scavenge pumping element 38 in the form of a disc carried on the shaft 20. The periphery of element 38 is aligned with the scavenge port or ports 34 so that centrifugal force arising from rotation of the shaft 20 and element 38 forces oil contacting the disc into the scavenge port(s) 34.

Oil may drain into the collection chamber 30 from the bearing 22 and through at least one drainage port 40 in bearing chamber wall 28 at the exit of drainage passages 42 that communicate with spaces (not shown) within a structure surrounding bearing housing in which lubricating oil may accumulate in some or all orientations of the engine. The passage or passages 42 are formed to drain the contents of such spaces into a convenient space, such as collection chamber 30 from which the oil may be scavenged.

In FIG. 2 the illustrated arrangement has the axis of shaft 20 oriented in a horizontal direction, i.e., across the page in a left-right direction. This is considered to be a normal orientation for an aircraft propulsion engine in cruise operation. A civil aircraft propulsion engine normally spends the majority if not all of its operating life in this orientation with the axis of its main shaft, such as shaft 20, within a few degrees of horizontal. The greatest excursion from a substantially horizontal orientation occurs during a climb phase when an engine has a nose-up attitude at a greater angle. The capacity of the oil system, in particular the oil tank ensures a sufficient supply of oil. However, certain types of aircraft may be expected to operate at completely different attitudes of nose-up, nose-down or inverted for relatively long periods. In these cases attention is paid to identify potential oil trap spaces and to provide drainage passages through which the spaces may drain into a convenient collection chamber whatever the orientation of the engine axis. However, it has been found in practice that the efficiency of the scavenge collection system is not constant and in some instances scavenge oil is not picked up and can be prevented from draining into the collection chambers.

Figures 3, 4A, 4B:
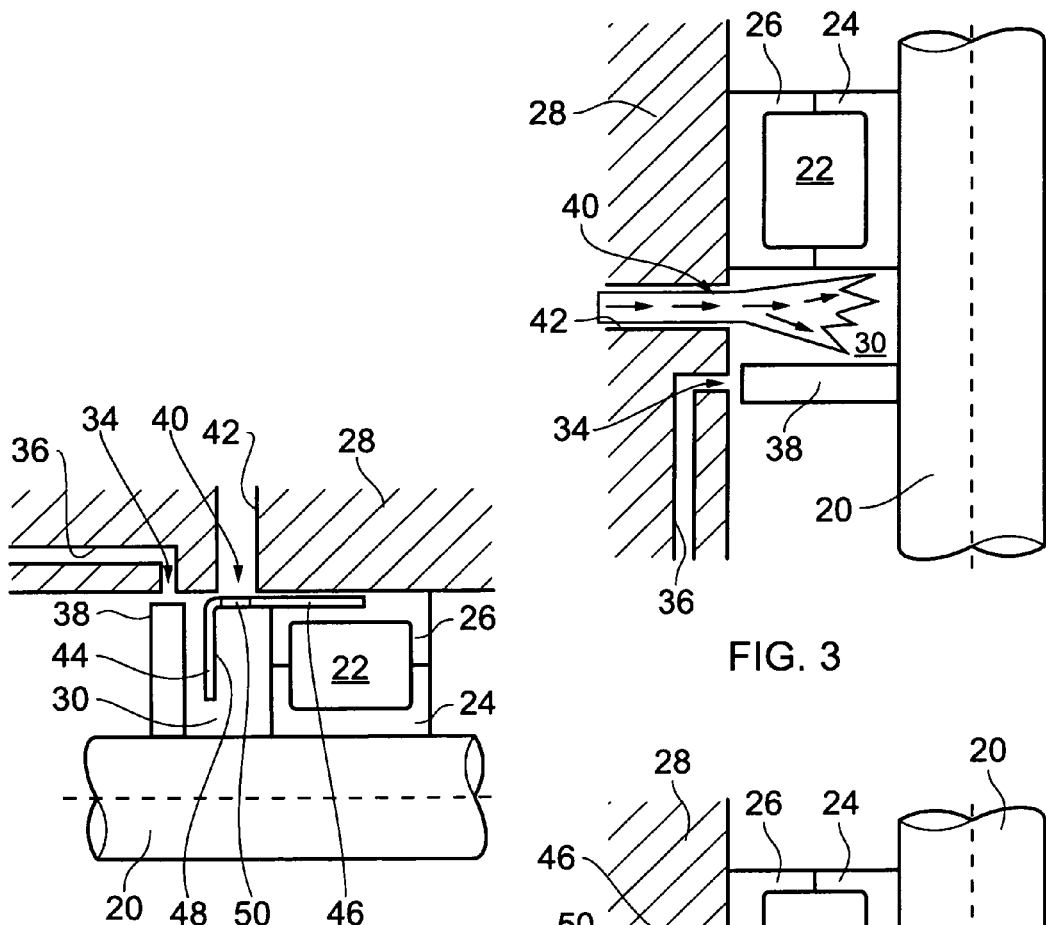
FIG. 3 is a schematic illustration of the scavenge arrangement of FIG. 2 in nose-down attitude.
FIGS. 4a and 4b show a modified arrangement incorporating the invention in orientations corresponding to FIGS. 2 and 3, and FIGS. 5a and 5b show a further embodiment of the invention in different orientations.

FIG. 3 illustrates the arrangement of FIG. 2 rotated counter-clockwise through 90 degrees to a nose-up position. In the situation of FIG. 3 the normal draining of oil into the scavenge collection chamber 30 may be interrupted unless special attention is paid to the positioning and layout passages of drainage passages 42 relative to the element 38.

The oil tank 2 is provided with internal means (not shown) to ensure oil pick-up at all engine orientation so the oil pumping system will continue to operate as normal until the contents of oil tank 2 have been distributed through the oil pump 4. Unless the scavenge system can continue to return oil to oil tank 2 the lubrication system eventually will be starved of supply. Passages such as indicated at 42 must be provided and located with regard to providing drainage paths from enclosed spaces into collection chamber 30 where oil may be recirculated. However, problems may arise in the orientation of FIG. 3 because returning oil draining from passage 42 may be forced back through port 40 by windage effects in the collection chamber 30. As a result oil is effectively prevented from draining into the chamber 30 and being recirculated back into the scavenge offtake port 34 and passageway 36.

The solution provided by the present invention is shown in FIGS. 4a and 4b comprises a weir, or shield generally indicated at 44, placed between the scavenge port 40 and the scavenge pumping element 38. The effect of shield 44 is to help establish a flow pattern within collection chamber 30 which effectively guides oil droplets and oil mist onto the element 38 at a radial point near to the shaft 20. This is found to be more effective at maintaining an oil film across the surface of the element 38 which is shed from the periphery of the disc under centrifugal force into the scavenge offtake port 34.

As shown in FIGS. 4a and 4b the shield 44 may comprise a shaped and perforated annular member of sheet metal material thickness. The component configuration illustrated has an "L-shaped" cross section consisting of a cylindrical portion 46 that extends in a substantially axial direction parallel to the axis of shaft 20, and an annular portion 48 lying in a substantially radial plane at one end of the cylindrical portion 46. For the purpose of mounting the weir the cylindrical portion is formed with a radius matching the radius of the outer surface of the outer race 26 of bearing 22. Exact dimensions depend upon the details of a chosen mounting arrangement. For example the cylindrical portion 46 could be trapped between the wall of the bearing housing and the bearing outer race 26, or the housing wall could be at least partly recessed to receive the portion, providing bearing loads can be satisfactorily transferred to the housing wall. A number of apertures or slots 50 are formed in the cylindrical portion 46 of the shield member corresponding to the size and spacing of the scavenge intake ports 40 in the bearing chamber wall.

Figure 5A:
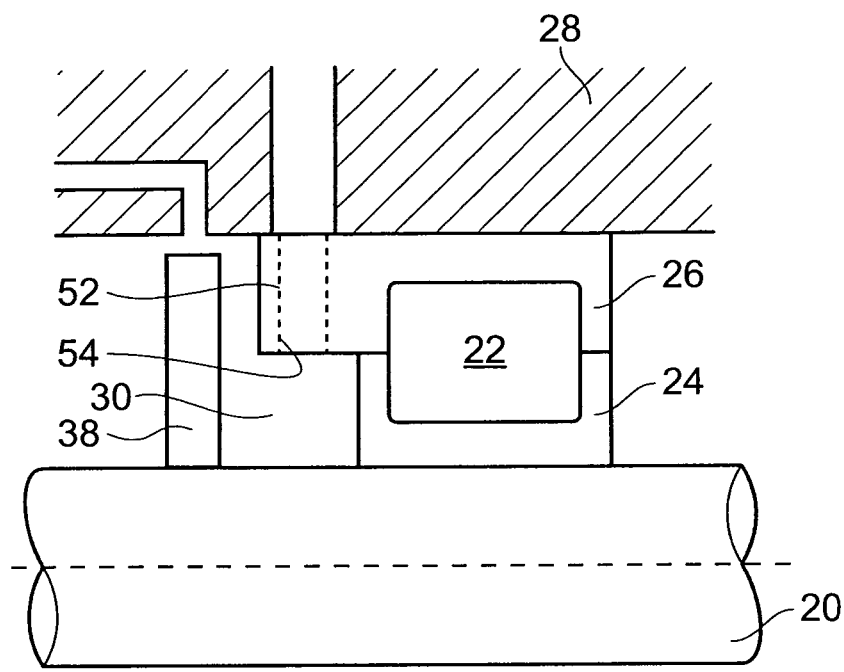
Figure 5B:
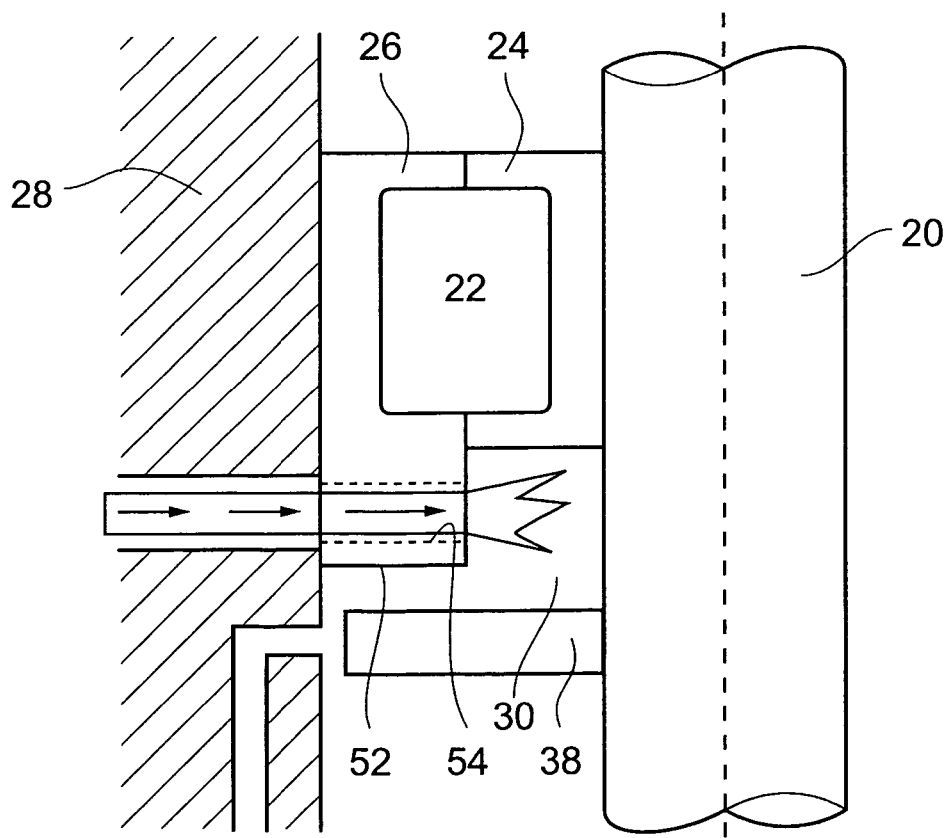

However, such an arrangement involving an additional component, i.e., shield 46 that has to be manufactured accurately and positioned correctly during assembly suffers inherent disadvantages. A solution is illustrated in FIG. 5 in which the outer race 26 of the bearing 22 is extended laterally at 52 to provide a portion functionally equivalent to the shield 44. The extension portion 52 of outer bearing race 26 is provided with a number of machined slots 54 spaced apart around the circumference of the bearing race that extend fully through the extended race wall 52 in a substantially radial direction. There are as many such slots 54 as the number of scavenge ports 40 in the bearing chamber wall. Each slot permits scavenged oil from a drainage passage 42 to enter the collection chamber 30 through ports 40. The thickness of the extended race portion 52, i.e., the dimension in a radial direction, is sufficient to act as an effective shield over the element 38. Scavenged oil is thus passed into collection chamber 30 and towards a more advantageous, radially inner position on the element 38.

The arrangement illustrated shows a collection chamber 30 at one side of a bearing 22. It will be understood that a similar arrangement may be provided at the opposite side of the bearing to function in the same manner when the bearing orientation is inverted relative to the orientation illustrated in FIGS. 4b and 5b, i.e., rotated through an angle of 180 degrees.

The invention claimed is:

1. A lubricant scavenge system comprising:
   a scavenge pump,
   a collection chamber,
   at least one drainage path leading into the collection chamber,
   a scavenge pumping element located in the chamber,
   at least one off-take passageway in a chamber wall leading from the collection chamber to the scavenge pump, and
   a shield located between the drainage path and the off-take passageway adjacent a face of the scavenge pumping element, located closer to the drainage path than the scavenge pumping element, and acting in operation to shield the face of the scavenge pumping element.

2. A lubricant scavenge system as claimed in claim 1 wherein the at least one off-take passageway is formed in the chamber wall in close proximity with a periphery of the scavenge pumping element.

3. A lubricant scavenge system as claimed claim 1 wherein the shield comprises a member substantially parallel to a plane of the scavenge pumping element.

4. A lubricant scavenge system as claimed in claim 1 in which the collection chamber comprises part of a bearing chamber of a rolling element bearing for a rotary shaft, and there is provided an oil supply to lubricate the bearing, wherein the collection chamber is provided at one side of the bearing and the scavenge pumping element is driven by the shaft.

5. A lubricant scavenge system as claimed in claim 4 wherein the drainage path is arranged to empty other parts of a surrounding structure into the collection chamber, and emerges into the chamber between the scavenge pumping element and the bearing.

6. A lubricant scavenge system as claimed in claim 5 wherein the drainage path emerges in the wall of the collection chamber between the off-take passageway and the bearing, and the shield member is located on the opposite side of the drainage path to the bearing.

7. A lubricant scavenge system as claimed in claim 6 wherein the drainage path emerges in the wall of the collection chamber adjacent an outer race of the bearing.

8. A lubricant scavenge system as claimed in claim 6 wherein the shield member comprises an additional component.

9. A lubricant scavenge system as claimed in claim 6 wherein the shield member is integrated with an outer race of the bearing.

10. A lubricant scavenge system as claimed claim 1 wherein the shield member carries the drainage path towards a radially inner portion of the scavenge pumping element.

* * * * *